(No Model.)
J. K. ROSS.
ROLLER SKATE.
No. 243,979.          Patented July 5, 1881.
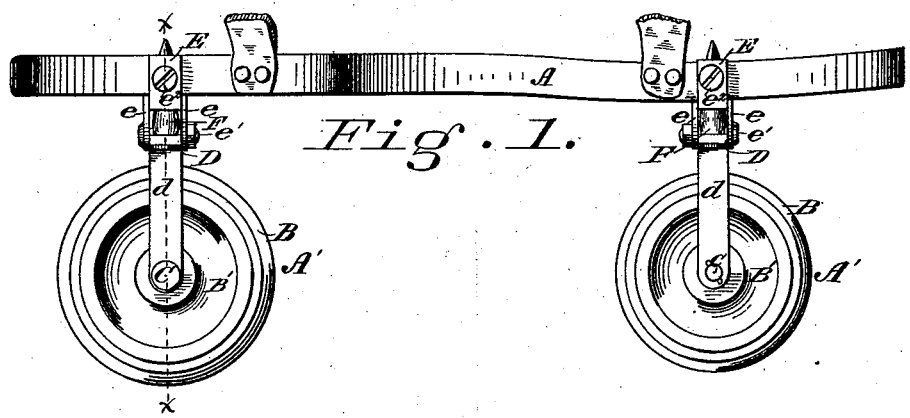
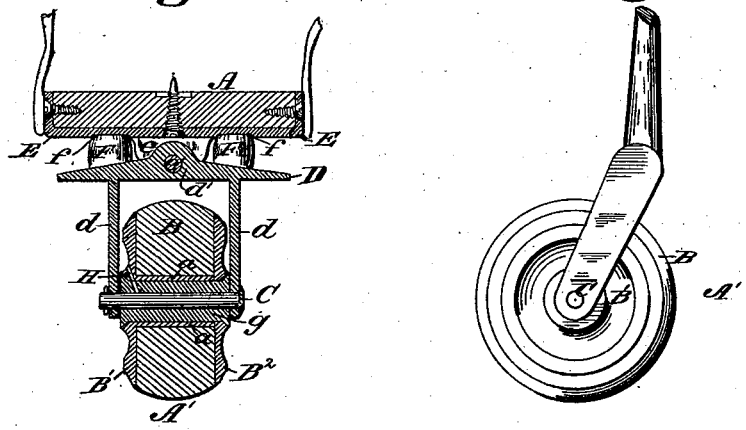
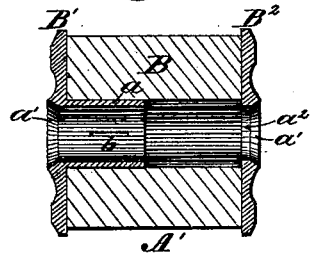
Attest.
E. K. Hill
J. Mc Strehli
Inventor.
James K. Ross,
per Wm. Hubbell Fisher,
Atty

UNITED STATES PATENT OFFICE.

JAMES K. ROSS, OF SPRINGFIELD, OHIO.

ROLLER-SKATE.

SPECIFICATION forming part of Letters Patent No. 243,979, dated July 5, 1881.

Application filed March 2, 1881. (No model.)

*To all whom it may concern:*

Be it known that I, JAMES K. ROSS, of Springfield, in the county of Clarke, State of Ohio, have invented certain new and useful Improvements in Roller-Skates, of which the following is a specification.

The object of my invention is to provide a roller-skate that will be elastic, yet firm and noiseless.

One feature of my invention consists in the particular construction of the roller, and another feature consists in the particular method of connecting the roller to the foot-plate of the skate. These features will be herinafter fully described.

The first-named feature of my invention may be advantageously employed in the manufacture of furniture-casters, &c.

Referring to the drawings forming part of this specification, Figure 1 is a side elevation of a roller-skate constructed according to the various features of my invention. Fig. 2 represents a transverse section of a skate, taken through the line $x\ x$ of Fig. 1. Fig. 3 represents the relative position and form of the various elements forming the roller before the latter is completed. Fig. 4 represents one feature of my invention as applied to a furniture-caster.

A is the foot-plate of the skate, and A' the rollers. These rollers consist of the rubber disk B and the metal disks B' B². When the roller is completed the rubber disk is, as shown in Figs. 1 and 2, of greater diameter than the metal disks, so that the rubber disk is the only part of the roller that will come in contact with the floor or ground; but before the rubber disk is placed between the metal disks it is of a less diameter than the metal disks, as shown in Fig. 3, and much thicker than it is when the roller is completed.

From the inner face of the disk B' projects the tube or hollow box $a$, of a suitable length to come in contact with the inner face of the disk B² when the rubber is compressed, and the roller is completed. The disk B² has a central opening, $a^2$, the diameter of which is equal to the diameter of the opening through the tube $a$. The outer portion of the openings through the disks B' and B² is countersunk, as shown at $a'$. The rubber disk B has a central perforation sufficiently large to admit the tube $a$. This rubber disk is placed between the metal disks B' and B², the tube $a$ being introduced into the opening in the rubber disk, as shown in Fig. 3. These disks are now subjected to heavy compression until the end of the tube $a$ comes in contact with the inner face of the disk B². This compression enlarges the diameter of the rubber disk, so that it will extend beyond the edge of metal disks B' and B², as shown. Before the disks are relieved from compression molten metal, such as brass, Babbitt metal, &c., is poured into the tube $a$ and allowed to harden. This filling, having entered the countersunk openings $a'$, acts, when hardened, as a rivet to hold the disks together. As a precautionary measure, to prevent the filling from slipping or turning, recesses $b$ may be formed in the tube $a$, and the molten metal enters these recesses and forms a stud which prevents any slipping. The roller may now be removed from the press. A hole is now bored through the center of the roller for reception of the bolt C, around which latter the roller turns. One of these disks, B' B², is preferably provided with an orifice, as H, whereby oil or other suitable lubricating substance can be introduced to the bolt C, thereby enabling the roller to turn easily upon said bolt, and thus facilitating the use of the skate, and preventing friction, and consequent wear of the bolt C, and that part of the roller which rests thereon.

When preferred, the disks B' B² and rubber disk B may be secured together by a rod or axle rigidly attached to said disks and projecting from each side of the roller, and turning in suitable bearings in the arms $d$. The mode of attaching this axle to the disks may be by retaining the tube $a$ and running metal in and around the axle and between that and the rod, or any other suitable mode may be employed. The metal disks B' B² need not necessarily be solid, as shown, but may be in the form of a spider, or any other desired form, so long as they effect a suitable compression of the rubber disk.

The number of rollers may be increased at will, and arranged as desired in reference to the foot-plate. The rollers are preferably located the one behind the other, as shown, and are preferably so placed with reference to each other that the central plane of revolution of each roller shall be coincident with the longitudinal axis of the foot-plate. The roller A' is supported in a yoke, D, the bolt C passing through the arms $d$ of said yoke and secured in position in any suitable manner, preferably, as here shown, by the bolt C, having at one end a head, and a hole through the other end, through which a pin is passed and so bent as to be securely prevented from slipping out of said hole. This yoke D is provided with a lug, $d'$, which fits between two ears, $e$, projecting from the clamp E, and a bolt, $e'$, passes through said ears and the lug $d'$, thus connecting the yoke D to the clamp E, which latter is secured to the foot-plate A by screws $e^2$. The body of this clamp E is provided with two openings, $f$, into each of which is placed one end of a cylindrical piece of rubber, F, the other end of said piece resting against the upper side of the yoke D. These rubbers F act as springs, which, by being compressed between the clamp E and the yoke D, permit of a limited amount of lateral vibratory motion of the yoke D in one direction or the other, according as one or the other rubber is compressed. Spiral springs may be substituted for these rubbers F, should the manufacturer so desire, but they are not so effective as the rubbers.

By the construction above described it will be seen that the roller will be very firm and yet sufficiently elastic to roll noiselessly over the ground or floor, as the compression to which the rubber disk is subjected renders it very solid, yet giving sufficient elasticity around its periphery to accomplish the purpose desired.

It will also be evident that the rubber rollers, in connection with the particular mode which I employ of connecting the rollers to the foot-plate, form a skate which can be worn with comfort by the skater, as it is not so liable to tire the ankles of the wearer as are the skates employing non-elastic rollers and a non-elastic connection between said rollers and the foot-plate of the skate. When the foot-plate is of metal the clamp E may be dispensed with, in which case the ears $e$ will be attached directly to the foot-plate, suitable recesses for the reception of the springs F being formed in or connected to the foot-plate.

It will be obvious that the particular form of roller described above may be used with advantage in casters for furniture and like articles, and when so used will fall within the scope of my invention.

What I claim as new and of my invention, and desire to secure by Letters Patent, is—

1. An elastic wheel or roller for skates, consisting of the metal disks $B'$ $B^2$, the former being provided with the hollow tube $a$, and the latter with central opening, $a^2$, and the rubber disk B, said rubber disk being of less diameter than the metal disks before the latter are secured together and compressed between said metal disks in the manufacture of the roller to such an extent as to cause the rubber to project beyond the metal disks when the roller is completed, substantially as and for the purposes specified.

2. The herein-described process of manufacturing rollers for skates, and the like, consisting of the following steps: first, the employment of two metal disks, one or both being provided with a central tube and a tubular section of rubber, said section being longer than the width of the finished roller, and of less diameter than the metal disks; second, compressing said rubber section between the metal disks until the rubber projects beyond the metal disks; third, filling the central tube with moiten metal, which is allowed to harden to hold the metal disks together; and, lastly, boring the center of the roller for reception of the axle, all substantially as and for the purposes specified.

JAMES K. ROSS.

Attest:
 WM. E. JONES,
 E. R. HILL.